July 28, 1959 M. BISHAF 2,896,284
SAFETY BELT AND BUCKLE STRUCTURE
Filed Nov. 17, 1954 2 Sheets-Sheet 1

Inventor
MORRIS BISHAF

July 28, 1959 M. BISHAF 2,896,284
SAFETY BELT AND BUCKLE STRUCTURE
Filed Nov. 17, 1954 2 Sheets-Sheet 2
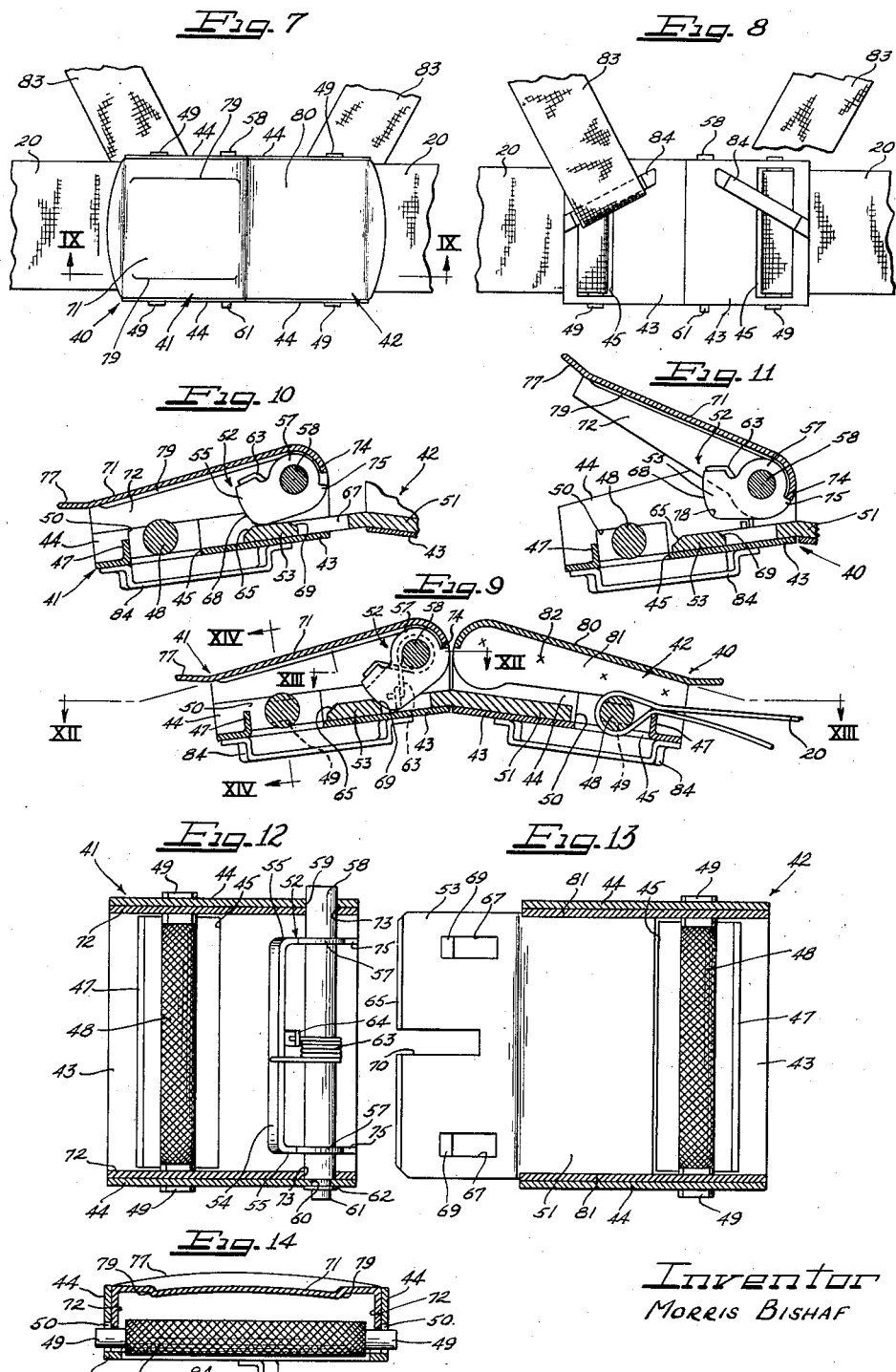
Inventor
MORRIS BISHAF United States Patent Office 2,896,284
Patented July 28, 1959

2,896,284

SAFETY BELT AND BUCKLE STRUCTURE

Morris Bishaf, Skokie, Ill., assignor to Stein Bros. Mfg. Co., Chicago, Ill., a corporation of Illinois Application November 17, 1954, Serial No. 469,390

5 Claims. (Cl. 24—75)

The present invention relates to improvements in safety belt or harness structures, and more particularly concerns structures of this type especially useful as safety means for occupants of vehicles such as automobiles, trucks, airplanes, and the like.

Safety belts are standard equipment in airplanes. Although it is a known fact that a large percentage of serious injuries and fatalities in automobile accidents are caused by the occupants being thrown from their seats against hard or unyielding objects in the vehicle, or are thrown from the vehicle, there has not been as ready acceptance by the automobile using public of safety belts or harness as is desirable. Some of this resistance is no doubt due to complexities and thus high cost of installation heretofore necessary. However possibly more resistance has been encountered due to the cumbersomeness of prior structures, more especially in respect to the buckle constructions that have been utilized. Such prior buckles have taken more time and trouble to secure and release than the average motorist or motor vehicle passenger ordinarily wishes to bother about.

An important object of the present invention is to provide an improved safety belt structure.

Another object of the invention is to provide improved means in a safety belt structure for securing the same operatively in a vehicle.

A further object of the invention is to provide improved buckle means for safety belts.

Still another object of the invention is to provide an improved quick connectable and easily disconnectable safety buckle assembly.

Yet another object of the invention is to provide an improved safety belt and harness assembly.

Other objects, features and advantages of the present invention will be readily apparent from the following detailed description of a preferred construction taken in conjunction with the accompanying drawings, in which:

Fig. 7 is a fragmentary enlarged plan view of the safety buckle of the safety belts used in either of the installations exemplified in Figs. 1 through 4.

Fig. 8 is a rear plan view of the safety buckle and the associated straps of the safety belt and harness.

Fig. 9 is an enlarged longitudinal sectional view taken substantially on the line IX—IX of Fig. 7.

Fig. 10 is a fragmentary sectional view of the left-hand portion of the safety buckle as shown in Fig. 9 but with the connecting tongue element of the right-hand portion of the buckle in a partially assembled position.

Fig. 11 is a sectional view similar to Fig. 10 but showing the latch mechanism of the buckle opened.

Fig. 12 is a sectional elevational view through the left-hand or latch portion of the buckle as in Fig. 9 and taken substantially on the line XII—XII.

Fig. 13 is a sectional detail view of the right-hand or connecting tongue portion of the buckle taken substantially on the line XIII—XIII of Fig. 9.

Fig. 14 is a fragmentary sectional detail view taken substantially on the line XIV—XIV of Fig. 9.

Figure 1:
Figure 1 is a fragmentary elevational view of an automobile seat and floor showing a safety belt embodying features of the invention substantially as it appears in use.
Figure 2:
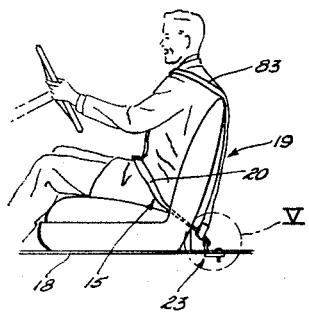
Fig. 2 is an elevational view similar to Fig. 1 but showing the use with the safety belt of a shoulder harness assembled therewith.

Having reference to Fig. 1, a safety belt 15 having features of the invention is illustrated as operatively associated with a front or driver's seat structure 17 of an automotive vehicle such as an automobile mounted in suitable manner upon a deck or floor 18 of the vehicle. The safety belt 15 may be used alone, or there may be associated therewith, as shown in Fig. 2, a shoulder harness 19.

Figure 3:
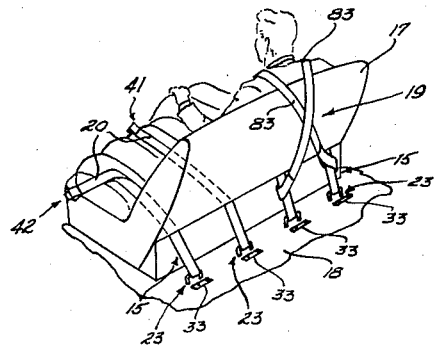
Fig. 3 is a rear elevational view of a vehicle seat showing details of installation and cooperation of safety belts and at least one shoulder harness, where the seat is equipped to serve two passengers at the same time.

It is preferable, of course, that both the driver's side of the seat 17 as well as the passenger's side of the seat be equipped with the safety device of the present invention, as shown in Fig. 3. Although the shoulder harness 19 is a desirable accessory or supplement to the safety belt 15 for both the driver and the passengers, if preferred the driver's side may be equipped with but the safety belt since the driver has advantage of the steering wheel for support in the event of forward impact of the vehicle against some unyielding object. It is highly advantageous for the passengers to have the additional shoulder harness 19.

It will be understood, of course, that although by way of illustration the front seat 17 of a vehicle has been shown in the drawings, a rear seat can also be equipped with the safety device, and as a matter of fact should be so equipped. Under modern high speed driving conditions the margin of safety is greatly increased by safety belt or harness means for holding the occupants of a motor vehicle in their seats and against being catapulted therefrom during a forward impact or even a sidewise impact which might cause them to be thrown from the vehicle.

Each of the safety belts 15 includes a pair of elongated strap members 20 of substantial width. By preference the strap members 20 are made from tough, durable woven webbing of a kind that will be highly resistant to stretching, flexure stresses, abrasion, or deterioration from corrosive fluids or chemicals or micro-organism action. A webbing made from synthetic fibers such as nylon serves well for the purpose. Furthermore with such webbing in the straps 20, various desirable colors may be supplied for color harmony with the interior finish of the associated vehicle.

Figure 5:
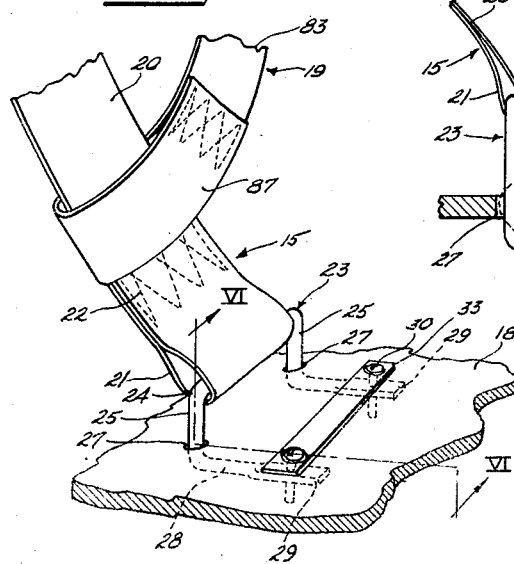
Fig. 5 is an enlarged fragmentary perspective view of that portion of the safety belt and shoulder harness assembly of Fig. 2 denoted by the circle V.

At one respective end, each of the seat belt straps 20 has a return bent loop terminal 21 secured by means of stitching 22 preferably disposed in multiple V or W pattern as shown (Fig. 5). This enables each of the straps to be connected by means of the eye or loop thus provided to an attachment bracket 23 constructed and arranged to be attached to the floor or deck 18.

According to the present invention, the attachment or anchor bracket 23 is of a novel construction enabling mounting thereof on the floor 18 in a novel manner which entirely avoids any need for getting under the car floor for the installation. To this end, the anchor bracket 23 comprises a generally inverted U-shaped member having a rung or bar body portion 24 of preferably somewhat greater length than the width of the strap 20, and with integral preferably identical, spaced, coextensive legs 25 projecting from the ends of the bar to depend in service assembly with the floor 18 through respective apertures 27. These apertures may be drilled through the floor from the inside of the vehicle at the proper locations behind and adjacent to the seat 17.

Projecting coextensively from the respective legs 25 are angular attachment arms 28 of substantial length provided with elongated coplanar flattened and thus substantially wider terminal portions 29. The arms 28 and the terminal portions 29 are arranged to underlie the floor 18 so that respective machine screws 30 extending down through respective apertures 31 drilled for this purpose through the floor 18 can be threaded into tapped respective holes 32 in the terminal portions 29 registering coaxially with the apertures 31. To strengthen the attachment an elongated anchor plate 33 is provided for overlying the floor 18 under the heads of the screws 30, with the shanks of the screws passing freely through respective apertures 34 in the anchor plate registering with the floor apertures 31. Respective lock washers 35 may be provided under the heads of the screws and over the anchor plate 33. Thus, when the screws are tightened up in the tapped holes 32 in the bracket extremity portions 29, the arms 28 of the bracket are drawn up tightly against the underside of the floor 18. Thereby pulling forces on the bracket 23 are distributed over a substantial area of the floor or deck plate 18 reinforced by the anchor plate 33.

Figure 6:
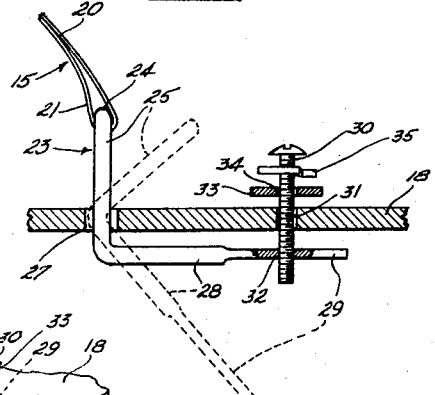
Fig. 6 is a fragmentary sectional detail view taken substantially on the line VI—VI of Fig. 5 and showing the attachment bracket and associated parts in more or less separated condition to illustrate the manner of assembly.

As best visualized in Fig. 6, in dash outline, assembly of the bracket 23 is readily effected from the top of the floor 18 by inserting the arms 28 down through the apertures 27 and then canting the bracket into the final assembled position and projecting the lower end portions of the legs 25 adjacent juncture with the arms 28 down through the floor apertures 27.

Where possible, as behind the front seat of the vehicle, it is preferred to have the bracket arms extend rearwardly since thereby upward and generally forward pulls on the bracket will be best distributed through the arms 28 to the underside of the vehicle floor without strains upon the floor plate about the apertures 27 through which the bracket arms 25 extend.

Separably connecting the strap members 20 is a buckle assembly 40 (Figs. 7 and 8) comprising separable sections 41 and 42. For standardization, both of the buckle sections 41 and 42 are as nearly as practicable similarly constructed. To this end each comprises a body member 43 which is preferably stamped up from suitable gauge sheet metal and provides in the principal portion thereof a base panel or plate provided with longitudinally extending opposite upstanding coextensive integral side walls 44. The width of the body member 43 between the side walls 44 is preferably only a little greater than the width of the strap members 20.

For clinching, but adjustable engagement with the respective strap member, each of the buckle section body members 43 is provided in one end portion of the base thereof with an aperture 45 extending all the way across and of substantial length defined at the margin thereof nearest the adjacent end of the body member with an upstanding abutment or clincher flange 47 (Figs. 10-13). Movable toward and away from the abutment flange 47 is a knurled preferably cylindrical clincher bar 48 provided with flatted-off opposite end portions 49 extending through respective longitudinally elongated guide slots 50 (Figs. 9 and 14). The respective free ends of the strap members 20 are looped over the bars 48, extending over the tops of the bars and thereunder and then over the respective clincher flange 47 as shown in Fig. 9. Through this arrangement, adjustment in length can be very easily effected by the simple expedient of slackening the respective strap members relative to the buckle sections and pulling the free end portions of the strap members until the desired adjustment has been effected, and then exerting pressure on the buckle to clinch the strap end portions as a result of drawing of the clincher bars 48 toward the opposing clincher flange 47 to grip the interposed end portion of the strap.

For separably connecting the buckle sections 41 and 42, one of the buckle sections, herein the buckle section 42, is provided with a tongue-like bar 51 arranged to cooperate with a latch member 52 carried by the other of the buckle sections, herein the buckle section 41. In a preferred form, the tongue bar 51 is of substantial, fairly heavy gauge sheet metal so that it can be made as a stamping and is of preferably the same width as the inside of the body member 43, having a substantial portion thereof welded to the forward end portion of the body member.

Latching interengagement of the tongue member 51 with the latch member 52 is effected by means of an extension portion 53 of the tongue arranged to extend freely slidably into the adjacent cooperating end portion of the buckle section 41. Since it is desirable that the buckle sections 41 and 42 be angularly related as best seen in Fig. 9 for greater user comfort, and therefore the adjoining ends of the buckle member side walls 44 are appropriately oblique, the projecting tongue extension 53 is conformably obliquely angled from the end of the body plate member 43 of the buckle section 42 so as to lie substantially flat against the body plate 43 of the buckle section 41.

In a preferred form, the latch member 52 comprises a generally U-shaped metallic stamping, including a narrow flat bar 54 somewhat shorter than the dimension between the side walls 44 of the buckle section 41 and provided with coextensive spaced parallel angularly related leg portions 55 each of which is provided with a similar enlarged lateral terminal portion 57 pivotally mounted upon a shaft 58. At its respective opposite end portions the shaft 58 is journalled in the buckle section side walls 44, adjacent to the buckle-joining end of the buckle section 41 in substantial clearance relation above the base plate portion of the member 43. By preference, one of the wall portions 44 has a bearing aperture 59 in which a full diameter end portion of the shaft 58 is journalled. The opposite side wall portion 44 has a reduced diameter bearing aperture 60 coaxial with the aperture 59, within which a reduced diameter journal extremity 61 of the shaft is journalled. This enables locking of the shaft 58 against axial displacement by equipping that portion of the reduced diameter journal portion 61 that projects outwardly beyond the journalling side wall 44 with means such as a retaining snap ring 62 cooperatively related to the shoulder at juncture of the reduced diameter and full diameter portions of the shaft and opposing the inner side of the supporting wall 44.

Normally the latch member 52 is biased into latching position as shown in Fig. 9 by resiliently yieldable means such as a torsion spring 63 curled thereabout and having one end portion thereof anchored to a stationary portion of the buckle section 41 such as a struck-up integral ear 64 (Figs. 9, 11 and 12). The opposite end portion of the torsion spring 63 is resiliently yieldably disposed in torsionally loaded condition upon the cross bar 54 of the latch member for normally biasing the latch member about its pivot to urge the arm or leg portions 55 toward the base plate of the body member 43.

By having the latch legs 55 offset from the axis of the pivot shaft 58 toward the inside of the buckle section 41, that is, away from the joining end of the buckle section, assembly of the tongue extension 53 with the latch is enabled by inserting the tongue extension into the open joining end of the buckle section 41 in the manner depicted in Fig. 10. During relative assembly movement of the buckle sections, a cam tip 65 of the tongue extension 53 engages under the depressed, resiliently biased latch legs 55 and cams the latch clockwise as seen in Fig. 10, in opposition to the bias of the spring 63, so that during further relative assembly movement of the buckle sections the latch rides over the top of the tongue extension.

As the buckle sections reach adjoining relation the latch arms or legs 55 snap down into longitudinally elongated respective clearance apertures 67 (Figs. 9, 10 and 13), and oblique respective latching shoulders 68 on the inwardly directed edges of the latch legs 55 enter into and are retained by the spring bias of the latch member in retaining latching engagement with complementary opposing oblique keeper shoulders 69 at the respective forward ends of the slot-like apertures 67. In practice excellent results have been obtained by having the respective keeper shoulders 69 disposed at approximately 40° angularity to the plane of the tongue extension 53. As a result, once the latched relationship is attained, with the generally complementary shoulders 68 and 69 coacting, any tendency toward separation or pulling apart of the buckle sections 41 and 42 is completely resisted. In fact the greater the separating pulling force, the more firmly does the interlocking latched relationship hold. This latching coaction is enhanced by disposition of the pivot axis provided by the shaft 58 for the latch 52 in an upwardly and outwardly offset relation to the keeper shoulders 69 in assembly in a transverse generally longitudinally oblique plane approximately normal to the plane of the keeper shoulders 69. There is thus provided in a direct, straight-line latching thrust of the latch arms 55 from the latch pivot to the latching shoulders 68 against the keeper shoulders 69.

It will be observed, especially from Figure 9, that during relative longitudinal separating pull imposed on the buckle sections or members 41 and 42, the keeper shoulders 69 tend to back the latch 52 away therefrom, that is pivotally counterclockwise. However, since the pivot pin or shaft 58 is mounted on a fixed axis above and offset outwardly toward the juncture end of the buckle member 41, that is the end from which the buckle tongue 51 is assembled therewith, relative to the operative position of the latch shoulders 68, and with the latch arms 55 extending on oblique counter-thrust axes toward the generally wedge shaped shoulders 69, with the latching shoulders 68 providing with the convergently related opposing face of the body plate member 43 a wedge-responsive jaw structure within which the shoulder 69 portion of the tongue extension 53 is grippingly wedged with retaining force proportionate to relative longitudinally separating pull on the buckle sections or members, an exceedingly powerful and positive separation-resistant latching interlock is attained.

For clearing the upstanding spring anchorage ear 64 in the assembled relation, the tongue extension 53 is preferably provided with an elongated forwardly opening clearance slot 70 (Fig. 13).

Release of the latch 52 so that the buckle assembly may be separated, is effected by lever means herein comprising a pivotally mounted cover 71 for the buckle section 41. To this end, the cover 71 may be formed as a sheet metal stamping and thus comprises a plate provided with coextensive parallel longitudinal side wall flanges 72 of an outside dimension which enables free slidable reception thereof within the corresponding upstanding side walls 44 of the buckle base member 43. Suitable, axially aligned bearing apertures 73 (Fig. 12) in the side flanges 72 journal the cover 71 pivotally upon the shaft 58.

At its proximal end portion, the cover plate 71 has a transverse downturned flange 74 which operatively opposes separable but normally engaged biasing spur shoulders at the heel portions or outer ends of the enlargements 57 of the latch legs. Thus, under the biasing force of the latch spring 63, the shoulders 75 normally urge the cover 71 into closing position by counterclockwise thrust against the flange or lip 74, as seen in Fig. 9.

On the other hand, when it is desired to release the latch 52 from the tongue extension 53, upward leverage on the cover 71 applied to a distal end handle lip 77 causes the cover to pivot about the shaft 58 so that the flange 74 of the cover depresses the latch shoulders 75 and thus pivots the latch member 52 clockwise as seen in Fig. 11 to disengage the latch shoulders 68 from the keeper shoulders 69. Then the tongue extension 53 can be withdrawn.

In order to facilitate the release swinging, arcuate movement of the shoulders 68 from the keeper shoulders 69, during the unlatching action, the latching shoulders 68 are preferably formed on a slight convex radius. Such radius, however, is substantially greater than a much smaller clearance relief radius 78 at the inner extremity of each of the latch shoulders 68 to enable the smooth and unobstructed camming release movement of the latch legs 55 past the keeper shoulders 69 as an incident to the unlatching action.

It will thus be apparent, that assembly of the buckle 40 is easily and quickly effected by inserting the keeper tongue extension 53 of the buckle section 42 into the latch end of the buckle section 41 until the latch member 52 snaps into latching, retaining engagement with the keeper tongue. The latched relation of the buckle sections persists until the unlatching lever-cover 71 is manipulated to release the latch member 52. Thereupon the buckle sections can be readily separated, or in the event of an emergency will fly apart as an incident to such release of the latch and pressure of the strapped-in person's body against the safety belt 15.

A convenient expedient for maintaining the latch member 52 against lateral displacement along the shaft 58 from properly centered position, comprises a retaining interengagement between the latch leg enlargement portions 57 and the cover plate member 71. To this end, properly laterally spaced, laterally outwardly facing indented respective retaining, centering shoulders 79 are provided in the cover plate adjacent to the proximal end thereof and cooperative with the respective latch member portions 57. For ornamental reasons, the indented shoulders 79 may be formed as longitudinally elongated ribs (Figs. 7, 9 and 14).

For symmetry and uniformity in appearance, the buckle section 42 is preferably provided with a cover 80 which substantially resembles the cover 71, and as a matter of fact may be formed up from the same dies for purpose of standardization as the cover 71. However, longitudinal side flanges 81 of the cover 80 are preferably permanently secured as by means of spot welding 82 to the side walls 44 of the buckle body plate 43 of the buckle section 42.

Figure 4:
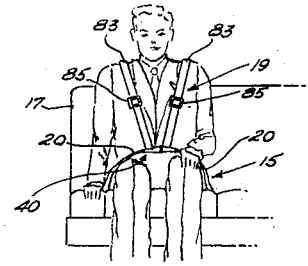
Fig. 4 is a fragmentary front elevational view of the right-hand portion of the seat of Fig. 3 showing the safety belt and harness in use.

For attachment of respective shoulder straps 83 of the shoulder harness 19, each of the buckle sections 41 and 42 is preferably provided on the back of the body plate 43 thereof with a generally U-shaped elongated attachment bar 84 (Figs. 8 and 9). These bars may be spot welded at their ends to the buckle plates and preferably extend in opposite diagonal directions as shown to accommodate the shoulder straps 83 without strain. By preferance adjustable end loops of the shoulder straps 83 are attached to the bars 84, and buckles 85 (Fig. 4) are provided for adjusting the length of the shoulder straps 83.

At the back of the seat 17 (Fig. 3) the shoulder straps 83 are preferably crossed, and the rear end portions of the shoulder straps are provided with fixed loop extremities 87 through which the seat belt straps 20 extend. Since the belt straps 20 extend rearwardly through an opening or openings between the back-rest and the seat portion proper of the seat assembly 17, the connecting loops 87 of the shoulder straps cannot slide up beyond a limited extent toward the buckle ends of the safety belt assembly 15.

By having the front end portions of the shoulder straps 83 attached to the separable end portions of the lap or seat belt members 20, and more particularly to the buckle sections 41 and 42, getting into and out of the combined safety belt and shoulder harness is facilitated since the shoulder straps and the seat belt strap members are simultaneously manipulable.

It will be understood that modification and variations may be effected without departing from the scope of the novel concepts of the present invention.

I claim as my invention:

1. In a safety belt buckle assembly, a buckle plate member, a second buckle member including a flat tongue slidably engageable over said buckle plate member, said tongue having adjacent opposite longitudinal marginal retaining shoulders facing away from the distal terminal of the tongue, a latch structure pivotally mounted on said plate member and providing retaining shoulders retainingly engageable with said tongue shoulders for maintaining the buckle members in coupled assembly, said buckle plate member having an upstanding lug thereon, a biasing spring anchored to said lug and resiliently engaging the latch structure for normally biasing the latch structure into latching position of the latch shoulders, said tongue having a longitudinal slot formed therein for clearing said lug in the assembled relationship of the buckle members, and means operable for moving said latch structure in opposition to the bias of said spring for releasing said latch shoulders from said tongue shoulders for uncoupling the buckle members.

2. In a safety belt structure, a buckle member adapted to be attached to a safety belt strap, said buckle member having a pivotally mounted latch, a spring carried by the member and normally biasing the latch in latching direction, a combination cover and latch operating lever independent of said spring and also pivotally mounted on the buckle member, and opposed normally abuttingly co-acting but separable respective shoulders on said latch and on said lever, said shoulders being separable responsive to relative angular pivotal movement between the latch and the lever but normally abuttingly coacting for biasing the lever into closing relation as a result of the biasing action of said spring through the latch, but the lever being relatively manually operable to lever the latch against the bias of said spring into a latch-released position.

3. In safety belt apparatus, a pair of non-metallic strap members, a pair of separable buckle members respectively attached to said strap members, one of said buckle members having a flat tongue provided with respective retention shoulders inclined generally away from the distal end of the tongue, the other of said buckle members having a base receptive of said tongue and pivotally mounted above said base a generally U-shaped latch member comprising a cross bar extending transversely of the assembly and a pair of coextensive spaced substantially parallel angularly related leg portions projecting laterally from the bar and providing journals for the latch member and each of which has a complementally inclined shoulder thereon relative to the respective shoulders of said tongue to engageably retain said tongue upon longitudinal relative assembly movement of the buckle members and thereby wedge the tongue against said base, means acting on said bar normally biasing the same into latching wedging relation with respect to said tongue shoulders, and means for moving said latch member in opposition to the biasing means for releasing said latch member shoulders from said tongue shoulders.

4. In a safety belt buckle structure, a body plate having marginal upstanding parallel side walls, a pivot pin extending between said side walls, a latch bar having angularly disposed spaced apart end flanges providing latching shoulders and enlarged terminal journal portions mounted on said pin, said bar being disposed in spaced relation to the pivot pin and being swingable thereabout, and a biasing spring anchored on said plate and engaging with said latch bar for normally biasing the same and thus the latching shoulders toward said plate for engagement with a second buckle member to be coupled with said first mentioned buckle member.

5. In a safety belt buckle structure, a body plate having marginal upstanding parallel side walls, a pivot pin extending between said side walls, a latch bar having angularly disposed spaced apart end flanges providing latching shoulders and enlarged terminal journal portions mounted on said pin, said bar being disposed in spaced relation to the pivot pin and being swingable thereabout, a biasing spring coiled about said pin and engaging with said latch bar for normally biasing the same and thus the latching shoulders toward said plate for engagement with a second buckle member to be coupled with said first mentioned buckle member, and a combination closure plate and latch operating lever having marginal flanges pivotally engaged with said pin and shoulder means cooperable with shoulder means on said terminal end flange journals of the latch bar normally acting to hold the cover-lever plate in covering relation to the buckle plate and latch bar but responsive to manipulation of the cover-lever plate in opposition to the bias of said spring to swing the latch bar and the latching shoulders thereof out of latching position.

References Cited in the file of this patent

UNITED STATES PATENTS

| | | |
|---|---|---|
| 1,004,166 | Hartman | Sept. 26, 1911 |
| 1,050,874 | Twombly | Jan. 21, 1913 |
| 1,275,034 | Huxley | Aug. 6, 1918 |
| 1,284,455 | Reinsdorf | Nov. 12, 1918 |
| 1,548,023 | Cowell | Aug. 4, 1925 |
| 1,569,088 | Humphrey | Jan. 12, 1926 |
| 1,648,015 | Freysinger | Nov. 8, 1927 |
| 1,692,418 | Primak | Nov. 20, 1928 |
| 1,719,903 | Rosenblum | July 9, 1929 |
| 1,995,439 | Tomplins | Mar. 26, 1935 |
| 2,110,684 | Schuhmann | Mar. 8, 1938 |
| 2,280,694 | Embree et al. | Apr. 21, 1942 |
| 2,312,946 | Watter | Mar. 2, 1943 |
| 2,365,625 | Carlisle | Dec. 19, 1944 |
| 2,458,810 | Varney et al. | Jan. 11, 1949 |
| 2,521,203 | Cotton | Sept. 5, 1950 |
| 2,710,999 | Davis | June 21, 1955 |
| 2,716,561 | Beran | Aug. 30, 1955 |

FOREIGN PATENTS

| | | |
|---|---|---|
| 180,866 | Great Britain | June 8, 1922 |
| 257,433 | Germany | Mar. 5, 1913 |
| 504,129 | France | Apr. 3, 1920 |
| 552,051 | France | Jan. 17, 1923 |
| 626,294 | France | May 9, 1927 |
| 729,523 | Germany | Dec. 17, 1942 |
| 774,248 | France | Sept. 17, 1934 |
| 791,479 | France | Sept. 30, 1935 |
| 820,902 | France | Aug. 9, 1937 |

OTHER REFERENCES

Ford Field, vol. 56, No. 9, pages 16 and 34, September 1954.